United States Patent [19]
Ohuchida et al.

[11] Patent Number: 5,684,779
[45] Date of Patent: Nov. 4, 1997

[54] OPTICAL HEAD WITH FORWARD AND REFLECTED LIGHT BEAMS PROPAGATING THROUGH A DUAL DIFFRACTION GRATING DEVICE ALONG A COMMON PATH

[75] Inventors: Shigeru Ohuchida, Machida; Hiroyoshi Funato, Chigasaki, both of Japan

[73] Assignee: Ricoh Company, Ltd., Tokyo, Japan

[21] Appl. No.: 585,437

[22] Filed: Jan. 11, 1996

[30] Foreign Application Priority Data

Jan. 12, 1995 [JP] Japan ................................. 7-002971
Sep. 8, 1995 [JP] Japan ................................. 7-231010

[51] Int. Cl.$^6$ ........................................ G11B 7/135
[52] U.S. Cl. .................. 369/109; 369/44.12; 369/44.23; 369/44.37; 369/103; 369/112; 369/116
[58] Field of Search ........................ 369/109, 112, 369/103, 110, 116, 44.12, 44.23, 44.14, 44.37

[56] References Cited

U.S. PATENT DOCUMENTS

| | | | |
|---|---|---|---|
| 5,015,835 | 5/1991 | Ohuchida et al. | 369/44.23 |
| 5,101,389 | 3/1992 | Ohuchida et al. | 369/112 |
| 5,115,423 | 5/1992 | Maeda et al. | 369/112 |
| 5,146,080 | 9/1992 | Opheij | 369/44.12 |
| 5,231,620 | 7/1993 | Ohuchida | 369/112 |
| 5,231,642 | 7/1993 | Scifres et al. | 372/45 |
| 5,243,583 | 9/1993 | Ohuchida et al. | 369/109 |
| 5,270,996 | 12/1993 | Ono | 369/112 |
| 5,278,817 | 1/1994 | Maeda et al. | 369/112 |
| 5,293,367 | 3/1994 | Kadowaki et al. | 369/44.37 |
| 5,428,588 | 6/1995 | Ohuchida | 369/112 |
| 5,493,555 | 2/1996 | Kimura et al. | 369/110 |
| 5,515,353 | 5/1996 | Miyazaki et al. | 369/112 |

*Primary Examiner*—Georgia Y. Epps
*Assistant Examiner*—Kim-Kwok Chu
*Attorney, Agent, or Firm*—Oblon, Spivak, McClelland, Maier & Neustadt, P.C.

[57] ABSTRACT

An optical head which records data onto an optical data recording medium and reproduces the data therefrom includes a laser light source, a collimator lens, an objective lens, a light splitting device arranged between the laser light source and the objective lens, for splitting the emitted light from the laser light and a reflected light from the optical data recording medium. A diffraction grating is provided to which only the reflected light split at the light splitting device is incident to, and which leads the reflected light split at the optical element onto a photo-detector. Thereby, an optical head of high effectiveness in utilization of light and low cost can be obtained.

16 Claims, 12 Drawing Sheets

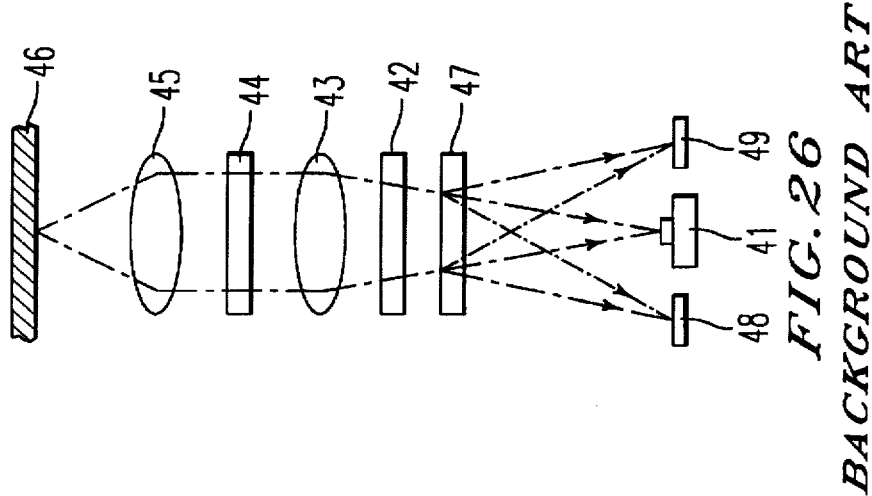
FIG. 26 BACKGROUND ART
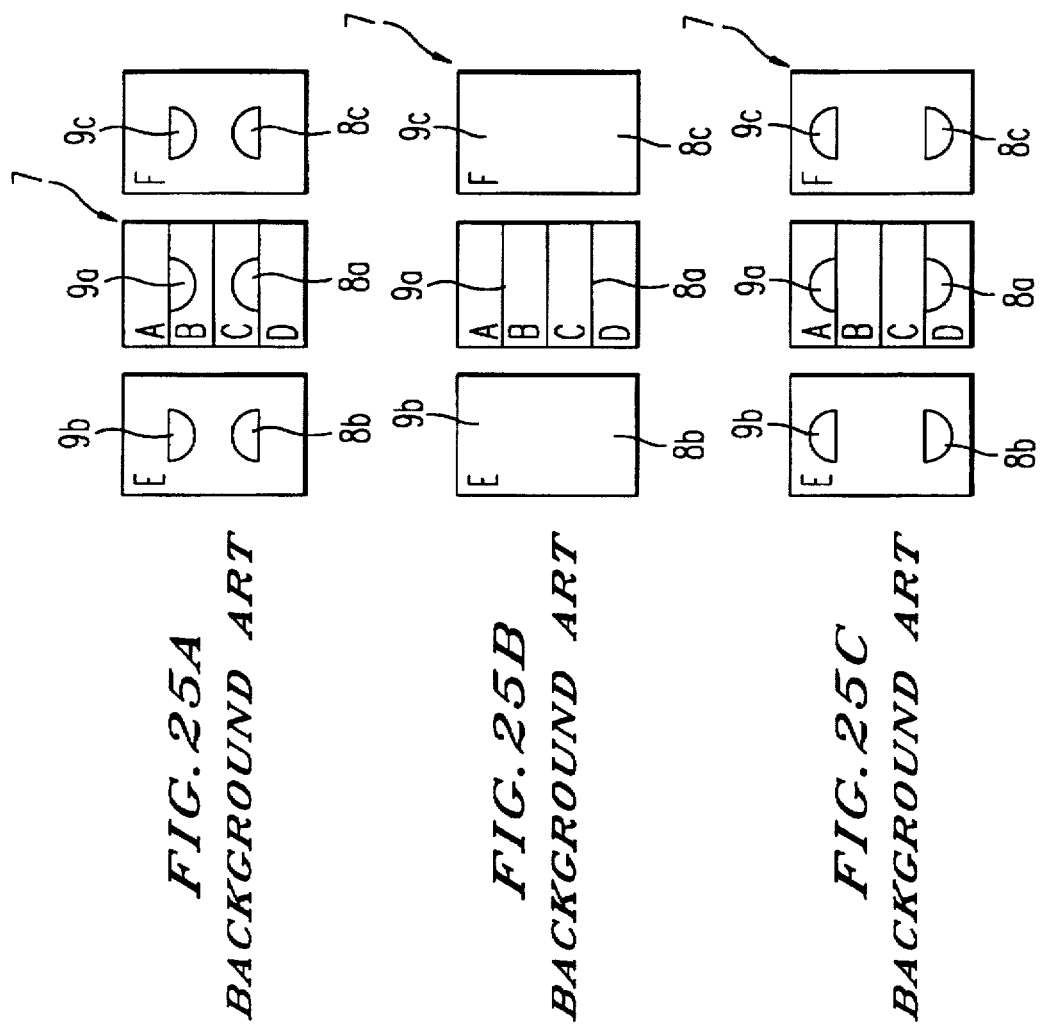
FIG. 25A BACKGROUND ART
FIG. 25B BACKGROUND ART
FIG. 25C BACKGROUND ART

OPTICAL HEAD WITH FORWARD AND REFLECTED LIGHT BEAMS PROPAGATING THROUGH A DUAL DIFFRACTION GRATING DEVICE ALONG A COMMON PATH

BACKGROUND OF THE INVENTION

1. Field of the Invention

The present invention relates to an optical head utilized in an optical data recording/reproducing apparatus which records, reproduces or erases data on an optical data recording medium, and particularly relates to an optical head utilized in an optical data recording/reproducing apparatus which employs a diffraction grating.

2. Discussion of the Background

One of background optical heads, which is disclosed in Japanese Laid Open Patent No. 64-55754, will be described, referring to FIG. 24. A laser light 1 emitted from a laser light source is incident to a grating surface 3 of a diffraction device 2 and is transmitted through a diffraction grating portion 3a of a center of the grating surface and through a non-diffraction grating portion 3b of its periphery, and therefore the laser light is split into three lights which are zeroth-order light 4a, and plus and minus first-order lights 4b and 4c. These lights are transmitted through a holographic grating surface 5 which is a reverse side of the grating surface 3, and are focused by an objective lens (not shown in FIG. 24), and are irradiated onto a surface of an optical disk 6, which is an optical data recording medium, in a state of a light spot. On the disk 6, the zeroth-order light 4a reads data, and the plus and minus first-order lights 4b and 4c detect a state of a track. The lights 4a, 4b, 4c are then reflected from disk 6, are incident to the holographic grating surface 5 of the diffraction device 2 again, and are split into a transmission light proceeding to the laser light source 1 and a diffraction light proceeding to a photo-detector 7. In this case, the diffraction light is split into first order diffraction lights 8a, 8b and 8c and first order diffraction lights 9a, 9b and 9c and they are led onto six surfaces A–F of the photo-detector 7. FIGS. 25(a)–25(c) show a shape of a light spot on the photo-detector 7. FIG. 25(b) shows a case that a disk surface is at a focal point, 25(a) shows a case that the disk surface is near from (closer to) the focal point and 25(c) shows a case that the disk surface is far (away) from the focal point. A focusing error signal Fe is detected by a wedge prism method and a tracking error signal Te and a reproducing signal Rf are detected by a three beam method. Equations for determining them are as follows.

$$Fe=(A+B)-(B+C) \quad (1)$$

$$Te=E-F \quad (2)$$

$$Rf=A+B+C+D \quad (3)$$

Reproducing the data recorded on the optical disk 6 or servo control, such as a focusing control or a tracking control, is executed by these signals.

On the other hand, another background optical head, which is disclosed in Japanese Laid Open Patents Nos. 3-225635 or 3-225636, will be described, referring to FIG. 26. In this optical head, it is intended that an optical system becomes an uniaxial system and effectiveness in utilization of light is improved by use of a structure of a birefringence diffraction grating. A light emitted from a semiconductor laser 41 is split into three beams by a diffraction grating 42 of the birefringence diffraction grating type and each light is collimated by a collimator lens 43. Then, each light of a liner polarization is converted to light of a circular polarization by a quarter wave plate 44, the light is focused in a state of a light spot by an objective lens 45 and is irradiated onto a surface of an optical disk 46. Each reflected light from the optical disk 46 is transmitted through the object lens 45 and the quarter wave plate 44, and as a result each light of the circular polarization is converted to light of a liner polarization perpendicular to a polarization direction of the incident light. Thus each reflected light is transmitted through the diffraction grating 42 and then is diffracted by a hologram device 47. Each diffracted light is then received by a six-divided photo-detector 48 or a photo-detector 49, and is employed for a detection of a servo signal or a reproducing signal.

In the background example in FIG. 24, the diffraction device 2 having the grating surface 3 and the holographic grating surface 5 functions for only splitting the light, and therefore some diffraction light within the emitted light from the laser light source 1 is not irradiated to the optical disk 6 and some transmission light within the reflected light from the disk 6 is not led to the photo-detector 7. Therefore an effectiveness in utilization of light becomes low. Such a phenomenon of the low effectiveness in utilization of light is not a problem in a read only optical disk such as a CD or LD etc. However, in a write-once type optical disk or a rewritable type optical disk, if the effectiveness in utilization of light is low, a light power in a recording mode cannot be enough, and also a carrier to noise ratio of a signal detected on the photo-detector 7 becomes low. Thus, in order to obtain enough light power, a high power laser light source is needed and therefore cost becomes high.

On the other hand, according to the other example in FIG. 26, the effectiveness in utilization of light is improved, however two valuable crystals which are a diffraction grating of the birefringence diffraction grating type 42 and a hologram device 47 are needed and therefore cost is high. Further, in the case of the diffraction grating of birefringence diffraction grating type 42, a difference of a refractive index between an ordinary ray and an extraordinary ray of the crystal is small and a stability with the passage of time about the refractive index is low, and therefore a diffraction efficiency is not high enough. As a result, the reflected light from the optical disk 46 cannot be led enough to the photo-detectors 48 and 49 and efficient signal detection cannot be achieved.

SUMMARY OF THE INVENTION

Accordingly, one object of the present invention is to provide a novel optical head utilized in an optical data recording/reproducing apparatus which employs a diffraction grating.

Another object of the present invention is to provide a novel optical head utilized in an optical data recording/reproducing apparatus which employs a diffraction grating, and which achieves high effectiveness in utilization of light and a low cost.

These and other objects and advantages are achieved by the present invention which provides an optical head which records data onto an optical data recording medium and reproduces the data therefrom including a laser light source, a collimator lens, an objective lens, a light splitting device arranged between the laser light source and the objective lens, for splitting the emitted light from the laser light and a reflected light from the optical data recording medium, and a diffraction grating which only the reflected light split at the light splitting device is incident to, and which leads the reflected light split at the optical element onto a photo-detector. Thereby an optical head of high effectiveness in utilization of light and low cost can be obtained.

BRIEF DESCRIPTION OF THE DRAWINGS

In describing preferred embodiments of the present invention illustrated in the drawings, specified terminology is employed for the sake of clarity. However, the present invention is not intended to be limited to the specific terminology so selected, and it is to be understood that each specific element includes all technical equivalents which operate in a similar purpose.

A more complete appreciation of the present invention and many of the attendant advantages thereof will be readily obtained as the same becomes better understood by reference to the following detailed description, particularly when considered in connection with the accompanying drawings, wherein:

FIG. 25(a) shows a state of a light spot on a six-divided photo-detector when a disk surface is near from a focal point;

FIG. 25(b) shows a state of a light spot on a six-divided photo-detector when a disk surface is at a focal point;

FIG. 25(c) shows a state of a light spot on a six-divided photo-detector when a disk surface is far from a focal point;

FIG. 26 is a structure view showing an optical head of another background device.

DESCRIPTION OF THE PREFERRED EMBODIMENTS

Figure 1:
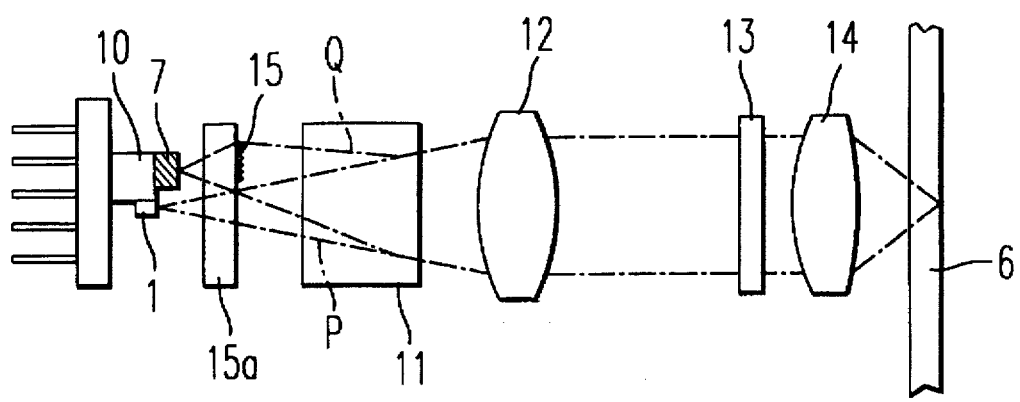
FIG. 1 is a whole structure view showing an optical head of a first embodiment of the present invention.

Referring now to the drawings, embodiments of the present invention will now be described. First, a first embodiment will be described, referring to FIGS. 1 and 2. In an optical head in this embodiment, a semiconductor laser as a laser light source 1, which is referred to as LD hereinafter, and a photo-detector 7, which is referred to as PD hereinafter, are arranged on a stem 10 adjacently. A wollaston prism 11, a collimator lens 12, a quarter wave plate 13 and an objective lens 14, which are optical elements, are arranged in this order in an optical path between the LD 1 and an optical disk 6 as an optical data recording medium. A diffraction grating 15 formed on a surface of a substrate 15a is arranged in an optical path between the wollaston prism 11 and the PD 7.

In such a structure, an emission light P of a linear polarization from the LD 1 is transmitted through the wollaston prism 11, and is collimated by the collimator lens 12. The collimated emission light P is converted into a circularly polarized light, is focused by the objective lens 14, and is irradiated onto a surface of the optical disk 6 in a state of a light spot. A light Q which reads data on the optical disk 6 and is reflected thereon, is converted into a linearly polarized light perpendicular to the emission light P by the quarter wave plate 13 and is incident to the wollaston prism 11. An optical path of the light Q converted into the linear polarization is bent by the wollaston prism 11, is split from the emission light P, and is led to the diffraction grating 15.

That is, the wollaston prism 11 functions as an optical element which changes an emission angle in accordance with a polarization direction of an incident light. This principle will be described referring to FIG. 2. When the polarization direction of the incident light is a Z direction, the emission angle Θ is 0 degree, and when the polarization direction is an X direction, the emission angle Θ is 1 degree. Thereby the emission angle Θ of the light emitted from wollaston prism 11 can be changed in accordance with the polarization direction of the incident light thereto.

In this way, the light Q incident to the diffraction grating 15 is split into plural lights which are a zeroth light, plus and minus first light etc., and they are received and detected on the PD 7. This PD 7 may be divided into plural detecting surfaces, and thereby a reproducing signal Rf for reproducing a data, a focusing error signal Fe and a tracking error signal Te are detected. Though a variety of shapes are considered as the diffraction grating 15 and the PD 7 in accordance with signal processing methods, a description will be omitted.

As described above, the light P proceeding from the LD 1 to the optical disk 6 does not pass through the diffraction grating 15, and only the light Q proceeding from the optical disk 6 to the PD 7 passes through diffraction grating 5. Therefore a ratio of the diffraction light not irradiated onto the optical disk 6 or that of the transmission light not detected on the PD 7 can be decreased largely, compared to the background optical heads. Further, the wollaston prism 11 has a function of a light isolator splitting the emission light P and the reflection light Q. Thereby a loss of the light led to the PD 7 is eliminated and an efficient detection can be achieved. Moreover, when the diffraction efficiency is intended to be high so that an amount of the light led to the PD 7 can be increased, the background device has a problem that an amount of the light led to the optical disk 6 is decreased instead. This embodiment can overcome this problem. Thus, an optical head of high effectiveness in utilization of light can be obtained and low cost can be also achieved because a low power LD 1 can be used. Further, as the LD 1 and the PD 7 are arranged adjacently to each other, stability with the passage of time and a small size can be achieved.

As the optical element, an element which changes the emission angle or the light axis of the emission light in accordance with the polarization direction of the incident light is possible, and it is not limited to the wollaston prism 11. Moreover, though the optical element is arranged between the PD 7 and the collimator lens 12, it can be arranged anywhere between the PD 7 and the objective lens 14.

Figure 2:
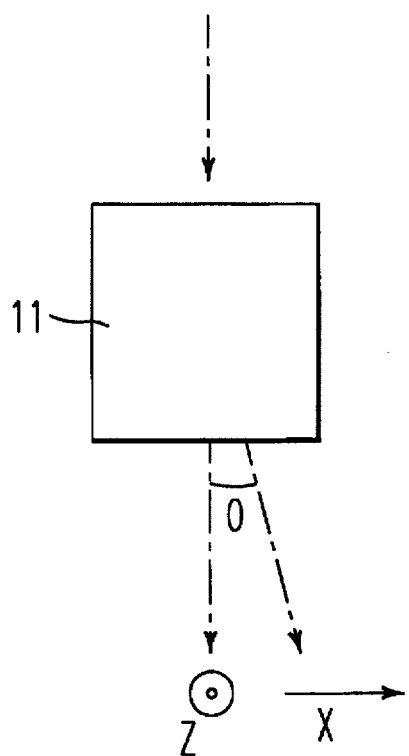
FIG. 2 shows a principle that an angle of an emission light is different in accordance with a polarization direction of an incident light in a wollaston prism.

Next, a second embodiment of the present invention will be described, referring to FIGS. 3 to 5. The same elements as shown in FIGS. 1 and 2 are designated by the same reference numerals and the description will be omitted.

Figure 3:
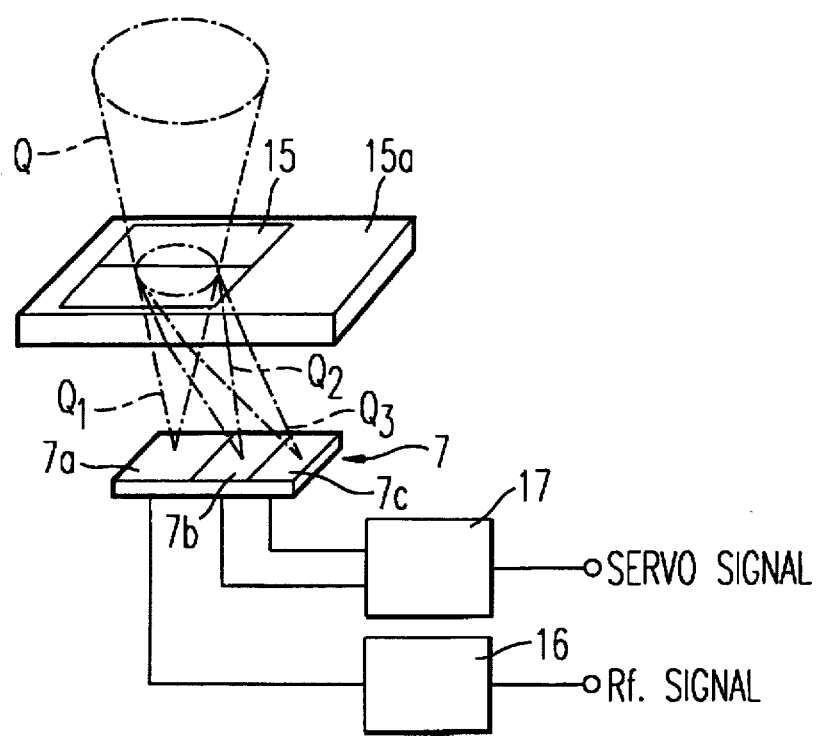
FIG. 3 is a schematic view showing a state of diffraction lights in an optical head of a second embodiment of the present invention.

In an optical head of the second embodiment, the PD 7 is divided into three detecting surfaces as shown in FIG. 3. A detecting surface 7a is arranged in an optical path of a zeroth light Q1 from the diffraction grating 15, and a high speed amplifier exclusive for a reproducing signal is connected to this detecting surface 7a. Detecting surfaces 7b and 7c are arranged respectively in optical paths of plus and minus first lights Q2 and Q3 from the diffraction grating 15 and a low speed amplifier 17 is connected to these detecting surfaces 7b and 7c.

Figure 4:
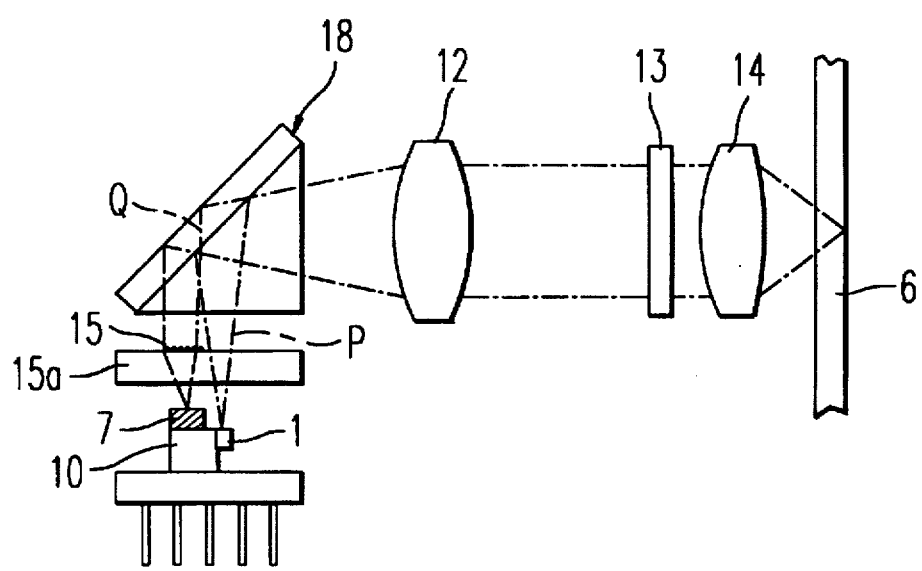
FIG. 4 is a whole structure view showing another optical head of a same concept as the first embodiment of the present invention.
Figure 5:
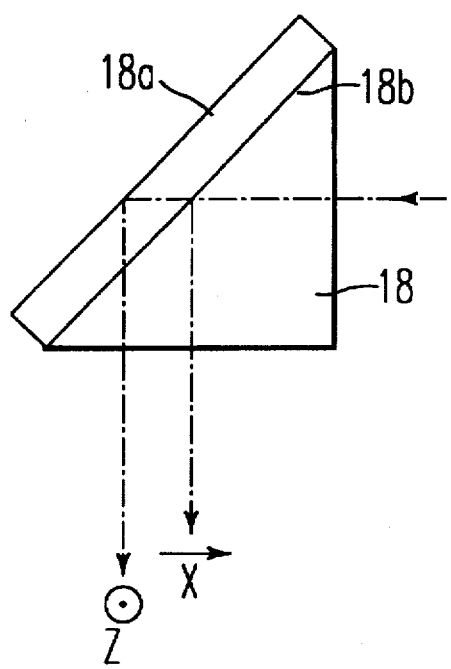
FIG. 5 shows a principle that an optical axis of an emission light is different in accordance with a polarization direction of an incident light in a PBS prism.

FIG. 4 is a whole structure view showing the optical head having the PD 7 in FIG. 3. A PBS prism 18 which is a Polarizing Beam Splitter is employed as the optical element therein. That is, this PBS prism 18 functions for changing a light axis of an emission light in accordance with a polarization direction of an incident light. Referring to FIG. 5, the principle is as follows. When the polarization direction of the incident light is a Z direction, the light is reflected on a reflecting surface 18a. On the other hand, when the polarization direction of the incident light is an X direction, the light is reflected on a reflecting surface 18b. Thereby the light axis of the emission light from the PBS prism 18 can be changed in accordance with the polarization direction of the incident light.

Generally, the reproducing signal Rf requires a higher speed signal processing, compared to the servo signals which are the focusing error signal Fe and the tracking error signal Te. Therefore a greater amount of the light is required in order to assure an adequate carrier to noise ratio. Therefore, in the background optical head, a sum of the servo signals which is a total sum of the light amount received on the detecting surfaces A to D as indicated by the equation (3) as referring to FIG. 25, is generally used as the reproducing signal Rf. However, in such a signal detecting method, high speed amplifiers must be connected to all the detecting surfaces A to D outputting the servo signals and therefore the cost becomes high.

On the other hand, in this embodiment of the present invention, the reflection light of a zeroth light Q1, which is not used in the background optical head, is used for detecting signals as shown in FIG. 3. Further, the zeroth light Q1 is not transmitted through the diffraction grating 15 when the emission light P proceeds to the optical disk 6, and is transmitted therethrough only when the reflection light Q is reflected on the optical disk 6. Thus, the reproducing signal Rf is detected using the zeroth light Q1 and the servo signals are detected using the plus and the minus first lights, whereby only one high speed amplifier 16 is required and low cost can be achieved. Moreover, as the diffraction efficiency can be even low, yield can be increased and productivity can become high.

The PD 7 can be divided into plural detecting surfaces and it is not limited to the three-divided detector shown in FIG. 3.

Next, a third embodiment of the present invention will be described, referring to FIGS. 6 to 7. The same elements as shown in FIGS. 1 to 5 are designated by the same reference numerals and the description will be omitted.

Figure 6:
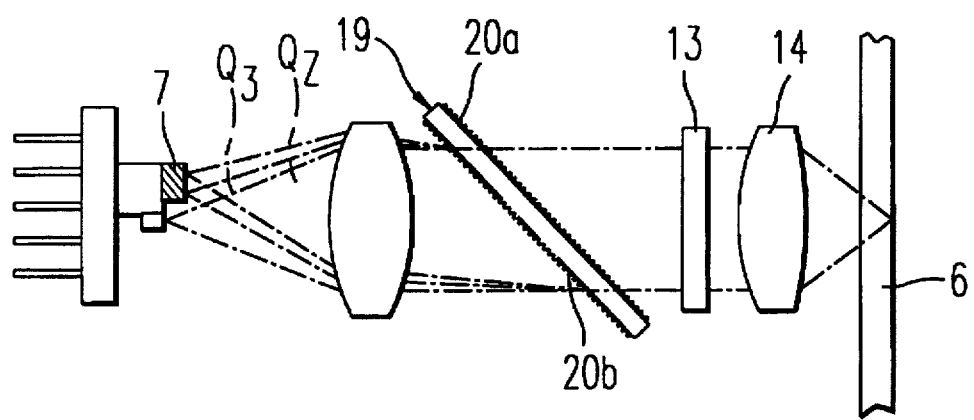
FIG. 6 is a whole structure view showing an optical head of a third embodiment of the present invention.
Figure 7B:
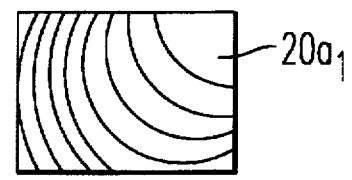
FIG. 7(b) is a front view showing one diffraction grating of the two diffraction gratings of different shapes.
Figure 7A:
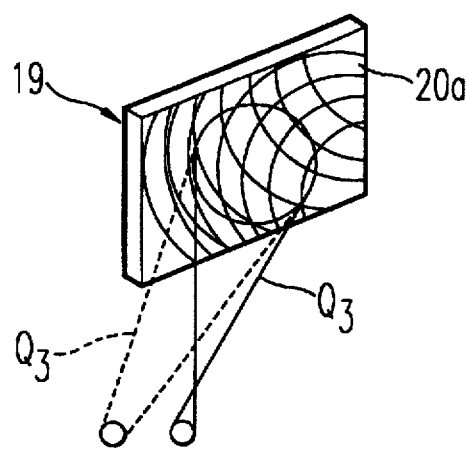
FIG. 7(a) is a perspective view showing a diffraction grating in which two diffraction gratings of different shapes are superposed.
Figure 7C:
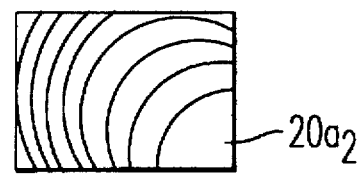
FIG. 7(c) is a front view showing the other diffraction grating of the two diffraction gratings of different shapes.

In an optical head of the third embodiment, as shown in FIG. 6, a dual-grating 19 is arranged in an optical path between the LD 1 and the objective lens 14. In the dual-grating 19, diffraction gratings 20a and 20b where a diffraction efficiency is changed in accordance with a polarization direction, are formed on both surfaces thereof. In this case, the diffraction gratings $20a_1$ as shown in FIG. 7(b) and $20a_2$ as shown in FIG. 7(c), in which a grating vector and a grating pitch are changed, are superposed such that the diffraction grating 20a which is formed on one surface of the dual-grating 19 as shown in FIG. 7(a) is formed. Thereby the dual-grating 19 of a high density and a deep groove having both a polarizing split function and a light split function can be formed.

In this structure, as the high density diffraction gratings 20a and 20b in which the pitch is shorter than a wavelength has the characteristic that diffraction efficiency depends on a polarization direction, the emission light and the reflection one of which polarization directions are different are split by the dual-grating 19. Especially, the diffraction gratings $20a_1$ and $20a_2$, in which a grating vector and a grating pitch are changed, are superposed such that the diffraction grating 20a on one surface of the dual-grating 19 is formed. Thereby two plus first lights can be generated and a focusing error signal can be detected using a difference of an optical path of these two lights by a beam size method. As this signal detection by the beam size method is stable with the passage of time and has larger adjusting tolerance, installation can be easier than other detecting methods of the focusing error signal. Moreover, in such a forming method that the diffraction gratings $20a_1$ and $20a_2$ are superposed, an accuracy for forming and positioning a boundary line and an accuracy for determining a beam irradiating position etc. are easier than a forming method in which a grating area is divided into plural areas, forming the diffraction grating itself and the installation can become easy, and therefore yield can be improved and production cost can be reduced.

Though, in this embodiment, the diffraction gratings $20a_1$ and $20a_2$ of which the grating pitch and the grating vector are different are superposed only on the one side of the dual-grating 19, it is possible to form them on both sides thereof.

Next, a fourth embodiment of the present invention will be described, referring to FIGS. 8 to 9. The same elements as shown in FIGS. 1 to 7 are designated by the same reference numerals and the description will be omitted.

Figure 8A:
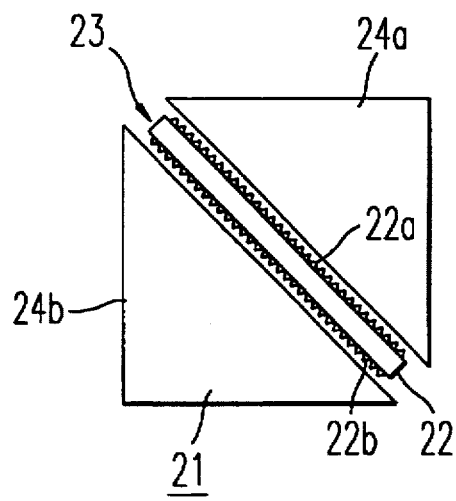
FIG. 8(a) is a side view showing a prism-diffraction device of a fourth embodiment of the present invention.
Figure 9:
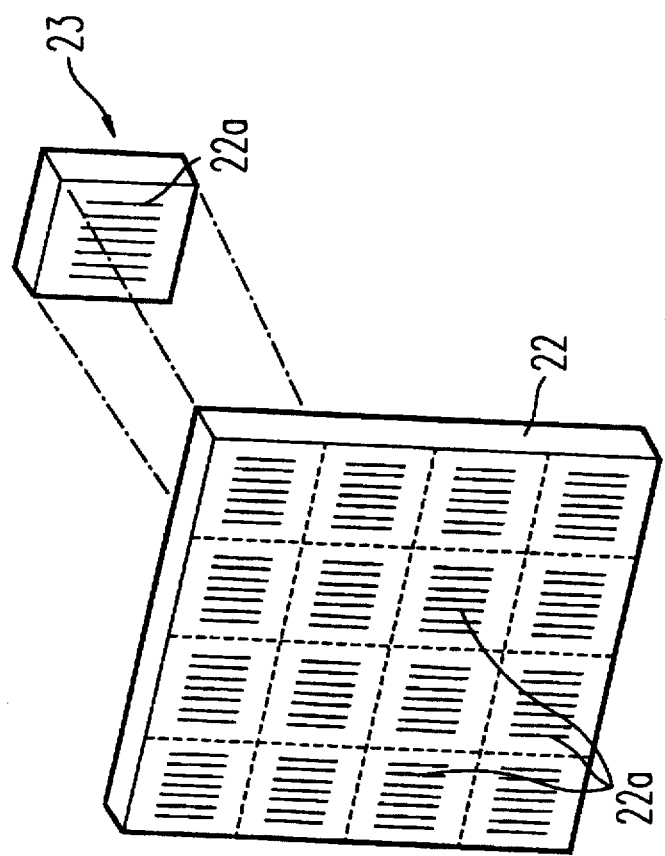
FIG. 9 is a perspective view showing a production process of a grating substrate of which a diffraction grating is formed on both sides.

In an optical head of the fourth embodiment, as shown in FIG. 8(a), a prism-diffraction device 21 is arranged. This prism-diffraction device 21 is of a cube shape, in which a grating substrate 23 where diffraction gratings 22a and 22b, of which a diffraction efficiency is changed in accordance with a polarization direction, are formed on both sides of a substrate 22, two prisms 24a and 24b sandwiching this grating substrate 23, are formed in unity. Such a prism-diffraction device 21 is arranged in the optical system as shown in FIG. 6, instead of the dual-grating 19.

In such a structure, as the diffraction efficiency of the high density diffraction gratings 22a and 22b has a polarization dependent characteristic, the emission light and the reflection light which have different polarization directions are split by the grating substrate 23. That is, as the polarization of the reflection light from the optical disk 6 is the same as a grating direction, approximately 100% of the light is diffracted by the high density diffraction gratings 22a and 22b and is led to the PD 7 almost without a loss of light. On the other hand, as the polarization of the emission light irradiating onto the optical disk 6 is different at 90 degrees to the grating direction, approximately 100% of the light is transmitted through the high density diffraction gratings 22a and 22b and is led to the optical disk 6 almost without a loss of light.

Figure 8B:
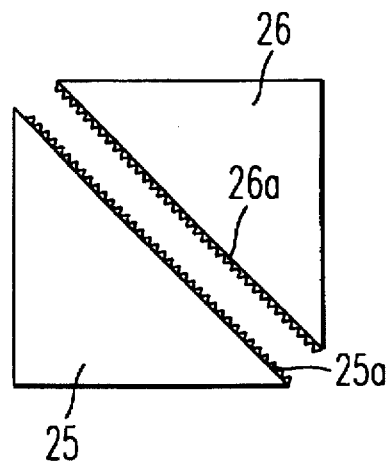
FIG. 8(b) is a side view showing a background device.

Generally, in the case of the device which has diffraction gratings on the both sides of the substrate, such as the dual-grating 19, it is required not to contact the grating surface during installation. In addition, as an astigmatic aberration is generated when the device is inclined and arranged in a divergent optical path so as to meet an incident condition of a Bragg angle, the cube shape is desired. FIG. 8(b) shows a device of a background cube shape and therein two prisms 25 and 26 are adhered as the surfaces where the diffraction gratings 25a and 26a face each other. However, a productivity is not necessarily high in such a structure.

On the other hand, in this embodiment of the present invention, the prism-grating device 21 in cube shape including the two prism 24a and 24b and the grating substrate 23 is used. In this case, see also FIG. 9, many diffraction gratings 22a and 22b are formed on both sides of a substrate 22 and the substrate is cut in a determined width so that the desired grating substrate 23 can be formed. Further, the prisms 24a and 24b are only adhered to both sides of the grating substrate 23 and thereby the prism-diffraction device can be produced in an easy process. This means that alignment of the both diffraction gratings 25a and 26a and adhesion of the both prisms 25 and 26 are not required to be performed simultaneously, which is different from the background optical head. As a result, productivity can be high. Then the prism-grating 21 of the cube shape formed by such a method is arranged in the optical path whereby generation of an aberration of the emission light P proceeding to the optical disk 6 can be suppressed. Further, such a prism-diffraction device 21 of the cube shape can also be arranged in a narrow optical path between the LD 1 and the collimator lens 12 and therefore a small size can be realized.

Figure 10:
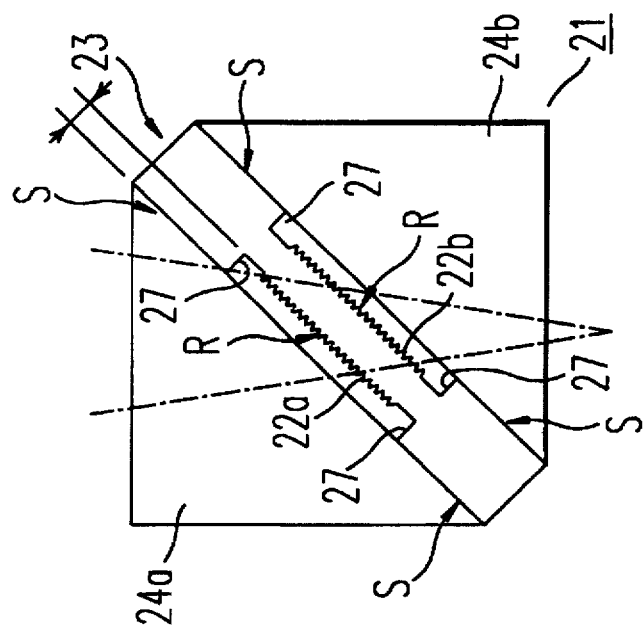
FIG. 10 is a side view showing a prism-diffraction device of a fifth embodiment of the present invention.

Next, a fifth embodiment of the present invention will be described, referring to FIG. 10. The same elements as shown in FIGS. 1 to 9 are designated by the same reference numerals and the description will be omitted.

This embodiment is based on the fourth embodiment described above and the grating substrate 23 of the prism-diffraction device 21 of cube shape includes a diffraction grating portion R and a plane portion S positioned at that periphery and contacted to surfaces of the prisms 24a and 24b. A step 27 is formed between the diffraction grating portion R and the plane portion S. This step 27 is formed so that tips of the diffraction grating 22a and 22b are lower by Δ, which is several μm, than the plane portion S. Such a step 27 can be formed by an etching before forming the diffraction grating 22a and 22b or an exposure of the periphery before exposing the diffraction grating 22a and 22b in a mastering process, and can be formed accurately by control of an etching speed or an exposure amount.

As described in the fourth embodiment, though the prism-diffraction device 21 is employed in order to suppress the astigmatic aberration which is generated when the grating substrate 23 is arranged in the divergent optical path, unless the interval between the two prisms 24a and 24b are as narrow as possible, the astigmatic aberration is generated.

On the other hand, in this fifth embodiment, the steps 27 are formed so that the tips of the diffraction gratings 22a and 22b can be lower than the plane portion S, and thereby the interval between the prisms 24a and 24b can become narrow and the generation of the aberration of the light P proceeding to the optical disk 6 can be suppressed to be as low as possible. Moreover, as such steps 27 protect the diffraction gratings 22a and 22b, treatment in installation can become easy and productivity can be improved.

Figure 11:
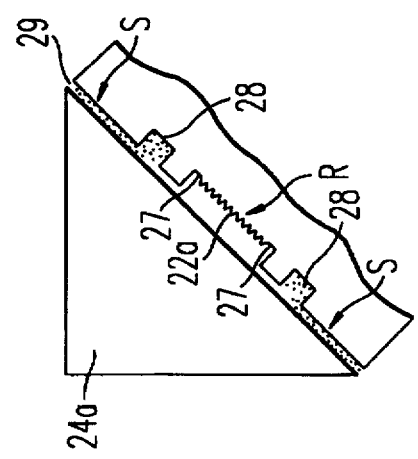
FIG. 11 is a side view showing a prism-diffraction device of a sixth embodiment of the present invention.

Next, a sixth embodiment of the present invention will be described, referring to FIG. 11. The same elements as shown in FIGS. 1 to 10 are designated by the same reference numerals and the description will be omitted.

This embodiment is also based on the fourth embodiment described above and a groove 28 as a groove portion is formed at the periphery of the diffraction grating portion R of the step 27 in the grating substrate 23 of the prism-diffraction device 21 of cube shape. As a producing method, the same method as the case of the step 27 can be used.

When the grating 23 and the prisms 24a and 24b are formed in unity, an adhesive 29 is inserted into between the plane portion S of the grating substrate 23 and the surfaces of the prisms 24a and 24b. At this time, if the adhesive 29 flows into the diffraction grating portion R, valley portions between the minute grooves are buried and therefore diffraction performance becomes low.

On the other hand, according to this embodiment, the grooves 28 are formed around the diffraction grating portion R whereby the flow of the adhesive 29 can be prevented, and thereby yield in the adhering work can be improved and productivity can be increased.

Figure 13:
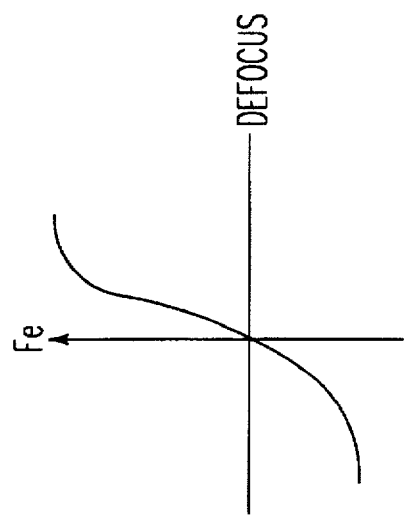
FIG. 13 shows an S-shaped curve of a focusing error signal.
Figure 12:
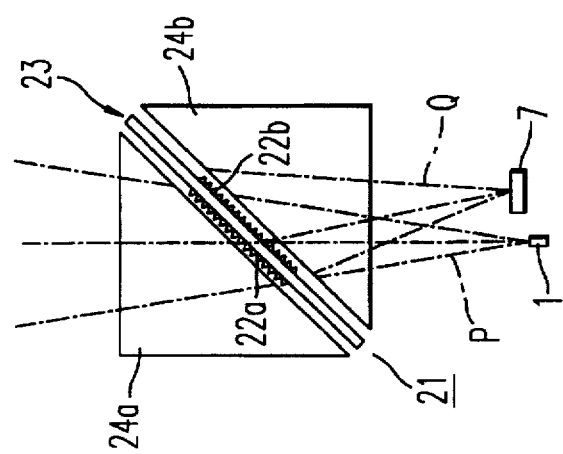
FIG. 12 is a side view showing a prism-diffraction device of a seventh embodiment of the present invention.

Next, a seventh embodiment of the present invention will be described, referring to FIGS. 12 and 13. The same elements as shown in FIGS. 1 to 11 are designated by the same reference numerals and the description will be omitted.

This embodiment is also based on the fourth embodiment described above, and as shown in FIG. 12, a chirping process is executed on the diffraction grating 22b which is formed on one surface of the grating substrate 23 of the prism-diffraction device 21 formed in a cube shape.

When the reflection light from the optical disk 6 is incident to the prism-diffraction device 21, the light diffracted by the diffraction gratings 22a and 22b slants through the prism 24b, and as a result, an aberration is generated. Such an aberration by a characteristic of the prism causes an S shape curve between the focusing error signal Fe vs. an amount of defocus to be unbalanced, as shown in FIG. 13, whereby accurate signal detecting cannot be achieved.

On the other hand, according to this embodiment, the reflection light Q is led to the diffraction grating 22b of the prism-diffraction device 21 on which the chirping process is executed, whereby the aberration of the light spot irradiated onto the surface of the PD 7 can be compensated for, the unbalance of the S shape curve of the focusing error signal Fe can be eliminated, and more accurate signal detecting can be achieved.

In this embodiment, though the chirping process is executed on only the diffraction grating 22b of one side of the substrate 23, it can be done on the diffraction grating of a reverse side or on the diffraction gratings of both sides.

Figure 14:
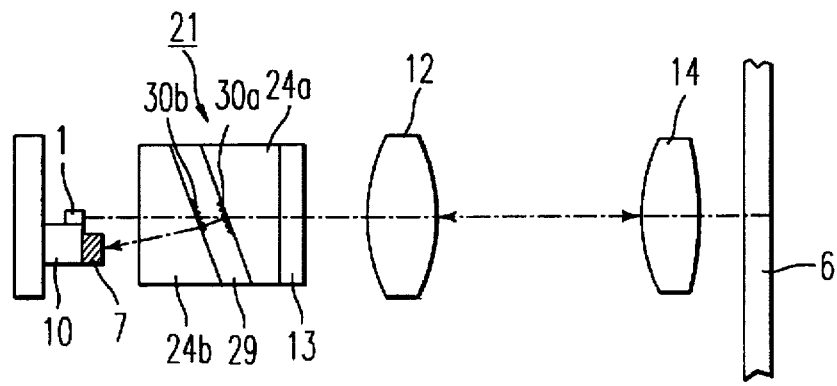
FIG. 14 is a whole structure view showing an optical head of an eighth embodiment of the present invention.
Figure 17:
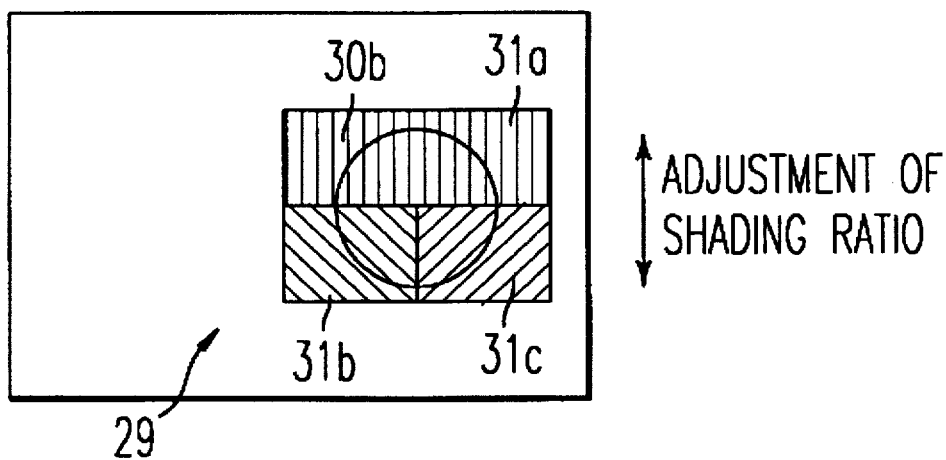
FIG. 17 is a front view showing a grating substrate where a diffraction grating is divided into three areas.

Next, an eighth embodiment of the present invention will be described, referring to FIGS. 14 and 17. The same elements as shown in FIGS. 1 to 13 are designated by the same reference numerals and the description will be omitted.

This embodiment is also based on the fourth embodiment described above, and as shown in FIG. 14, a thick grating substrate 29 is used in the prism-diffraction device 21 formed in a cube shape. Further, diffraction gratings 30a and 30b of both sides of the grating substrate 29 are formed as high density diffraction gratings having polarization dependance characteristics and are inclined at a Bragg angle. Moreover, in the grating substrate 29, for example, the diffraction grating 30b located in a side of the LD 1 is divided into three areas 31a, 31b and 31c of which the grating directions are different as shown in FIG. 17. These three areas 31a, 31b, 31c are formed as being suitable for detecting the reproducing signal Rf and the servo signals.

In the optical head indicated in this embodiment, the prism-diffraction device 21, the quarter wave plate 13 and the collimator lens 12 are arranged in this order between a stem 10 on which the LD 1 and the PD 7 are mounted and the objective lens 14.

In such a structure, the emission light P emitted from the LD 1 is transmitted through the prism-diffraction device 21 and the quarter wave plate 13 and is collimated by the collimator lens 12. This collimated light is focused onto the surface of the optical disk 6 by the objective lens 14. The reflection light Q from the optical disk 6 is transmitted through the objective lens 14 and the collimator lens 12 again, is incident to the prism-diffraction device 21 again and then is led to the PD 7.

Figure 15:
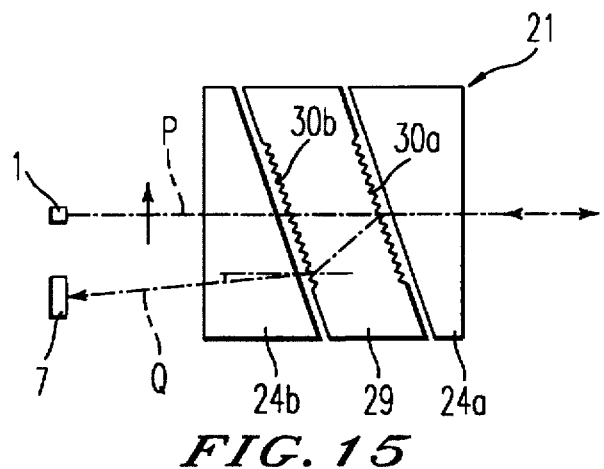
FIG. 15 is a side view showing a light splitting function of a prism-diffraction device of the eighth embodiment of the present invention.

An operation of this case will be described, referring to FIG. 15 showing an enlarged view of the prism-diffraction device 21. When the reflection light Q is incident to the prism-diffraction device 21, it is transmitted through the prism 24a, is diffracted at a diffraction grating 30a at a first surface of the grating substrate 29, proceeds through the grating substrate 29, and is split and diffracted at a second diffraction grating 30b divided into plural areas so as to be suitable for detecting the reproducing signal and the servo signals, is transmitted therethrough and is led to the PD 7. At this time, the polarization direction of the reflection light Q from the optical disk 6 is the same as that of the grating direction, which is a vertical direction to the surface of the Figure paper, and therefore approximately 100% of the light is diffracted by the high density diffraction gratings 30a and 30b, whereby a loss of light not led to the PD 7 is almost not generated.

Further, on the contrary, as the polarization direction of the emission light irradiated from the LD 1 onto the optical disk 6 is perpendicular to the grating direction, which is a parallel direction to the surface of the Figure paper, approximately 100% of the light is diffracted by the high density diffraction gratings 30a and 30b, whereby the light can be led to the optical disk 6 almost without a loss of light.

In this case, as the grating substrate 29 is inclined at a Bragg angle, an astigmatic aberration is generated. However, as the prisms 24a and 24b are formed in unity into a cube shape, the astigmatic aberration is not generated. Moreover, as the grating substrate 29 is covered with the prisms 24a and 24b, it is not injured if touched by hands and treatment becomes easy.

Further, as the LD 1 is heated, it is desired that the LD 1 and the PD 7 on the stem 10 are arranged to be separated at some interval. The prism-diffraction device 21 has a required function for splitting between the emission light P and the reflection light Q in accordance with the interval between the LD 1 and the PD 7. When the high density diffraction gratings 32a and 32b having only a characteristic that the diffraction efficiency depends on the polarization are used and a desired angle Θ is intended to be obtained by a pitch difference between these diffraction gratings 32a and 32b, with referring to background art of FIG. 16(b), the pitch difference between these diffraction gratings 32a and 32b are required to be large in order to assure a large split angle. As a result, the pitch of at least one of diffraction gratings 32a and 32b becomes out of an optimum pitch condition under which the diffraction efficiency depends on the polarization, and the effectiveness in utilization of light is decreased.

Figure 16A:
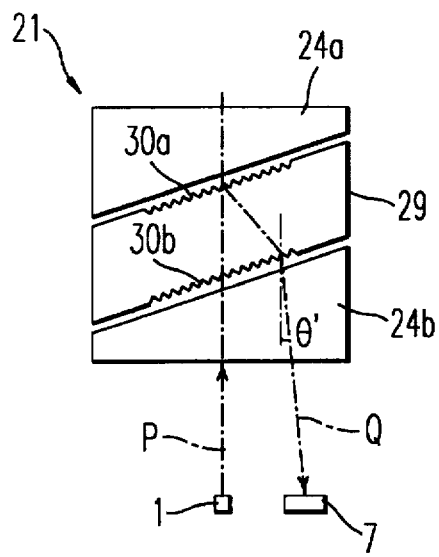
FIG. 16(a) is a side view showing an optical axis splitting function of a prism-diffraction device of the eighth embodiment of the present invention.
Figure 16B:
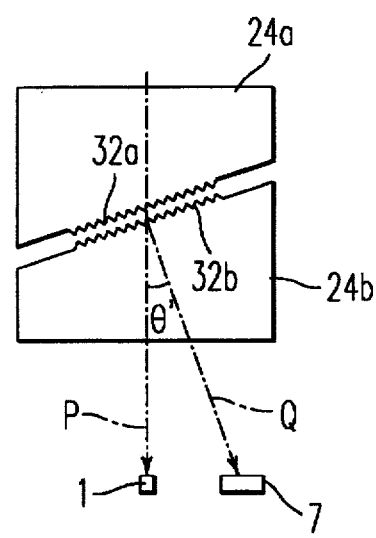
FIG. 16(b) is a side view showing a background device.

On the other hand, in this embodiment, as the grating substrate 29 on which the high density diffraction gratings 30a and 30b are formed on both sides of is used, and it is thick, the reflection light Q is split so that the optical axis of the reflection light Q can be different from that of the emission light P by the thickness of the substrate 29, as shown in FIG. 16(a), and in addition, reflection light Q is split at a split angle Θ' on the basis of the pitch difference between the diffraction gratings 30a and 30b. Therefore, even if the reflection light Q is required to be greatly split from the emission light P, as a basic split is assured by the thickness of the grating substrate 29, it is not necessary for the split angle Θ', on the basis of the pitch difference to be large. Thus the pitch of either one of the diffraction gratings 30a and 30b does not become out of the optimum condition under which the diffraction efficiency depends on the polarization, and a property relative location between the LD 1 and the PD 7 is achieved.

Though, in this embodiment, the diffraction grating 30b of the first surface is divided into plural areas which are utilized for the reproducing signal and the servo signals, that of the second grating can be divided into plural areas.

Next, a ninth embodiment of the present invention will be described, referring to FIG. 18. The same elements as shown in FIGS. 1 to 17 are designated by the same reference numerals and the description will be omitted.

An optical head in this embodiment is similar to the eighth embodiment described above. In the grating substrate 29 of the prism-diffraction device 21, a diffraction grating 30c is formed by a method that plural, for example two, diffraction gratings of different grating shapes are superposed, instead of the diffraction grating 30b which is divided into plural areas. That is, similar to the case described in FIG. 7, the high density diffraction grating 30c of one area is formed by a combination of two diffraction gratings of different grating shapes, for example a grating vector or a grating pitch. That is, the grating substrate 29 on which the diffraction gratings 30a and 30c are formed functions as a dual-grating having both polarization splitting and light splitting.

According to this structure, as the diffraction grating 30c of one surface of the grating substrate 29 is formed by the combination of two diffraction gratings of different grating shapes, for example the grating vector or the grating pitch, two diffraction lights with two optical paths can be generated, and a focusing error signal Fe can be detected by a beam size method, using a difference between these two optical paths. As this detection by the beam size method is stable with the passage of time and adjusting tolerance is wider than other focusing error signal detecting methods, installation becomes easy. Moreover, in such a forming method that the two diffraction gratings are superposed, as accuracy for forming and positioning a boundary line and accuracy for determining a beam irradiating position etc. are greatly eased compared to in a forming method in which a grating is divided into plural areas, forming the diffraction grating itself and installation can become easy, and therefore yield can be improved and production cost can be reduced. For example, in the case of the diffraction grating 30b which is divided into areas as shown in FIG. 17, the divided areas of the diffraction grating 30b must be positioned to a light axis so that a desired shading ratio can be obtained. However, in the case of the diffraction grating 30c, adjustment of the shading ratio is not necessary and adjustment for positioning to the light axis becomes easy.

Further, in this embodiment, though the diffraction grating 30c is formed on either surface of the grating substrate 29 by the method that the diffraction gratings having the different grating vector or the different grating pitch are superposed, such a shape can be formed on the both surfaces.

Next, a tenth embodiment of the present invention will be described, referring to FIG. 19. The same elements as shown in FIGS. 1 to 18 are designated by the same reference numerals and the description will be omitted.

An optical head in this embodiment is based on the eight embodiment described above, and in the prism-diffraction device 21, a diffraction grating 33, which divides the emitted light from the LD 1 into three lights, is formed in unity on an incident surface, which is a side of the LD 1.

According to this structure, the emitted light from the LD 1 is divided into three lights by the diffraction grating 33, is transmitted through the prism-diffraction device 21, and is irradiated to an optical disk 6 in a state of the three lights. Therefore, a three beam method or differential push-pull method can be used. These tracking detection methods have an advantage that signal detection is stable to a tilt of an optical disk 6, compared to that by a single light. Further, as the tracking detection by the three beam method can be applied to an optical disk 6 of a large track pitch and the detection by the differential push-pull method can be done to that of a small track pitch respectively, compatibility of servo control to optical disks of different track pitches can also be assured.

Further, in this embodiment, though the diffraction grating 33 is formed on the incident surface 24b of the prism-diffraction grating 21, which is the side of the LD 1, it can be formed at an emission surface of the prism 24a, which is a side of an objective lens 14.

Figure 19:
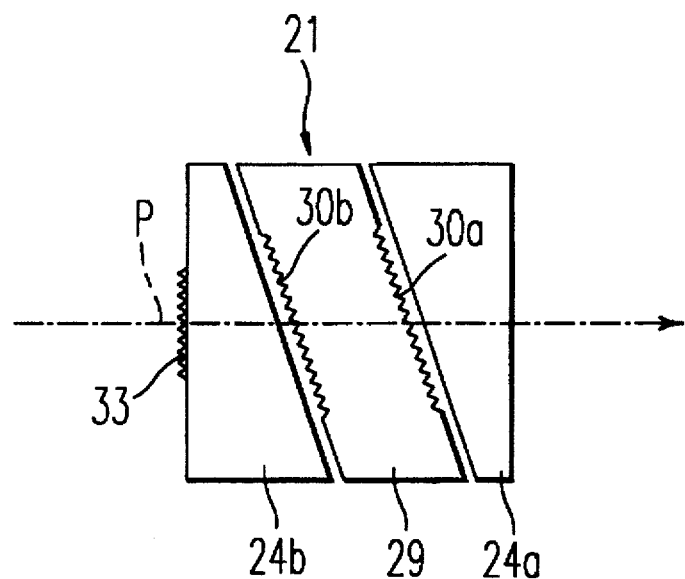
FIG. 19 is a side view showing a prism-diffraction device of a tenth embodiment of the present invention.
Figure 20:
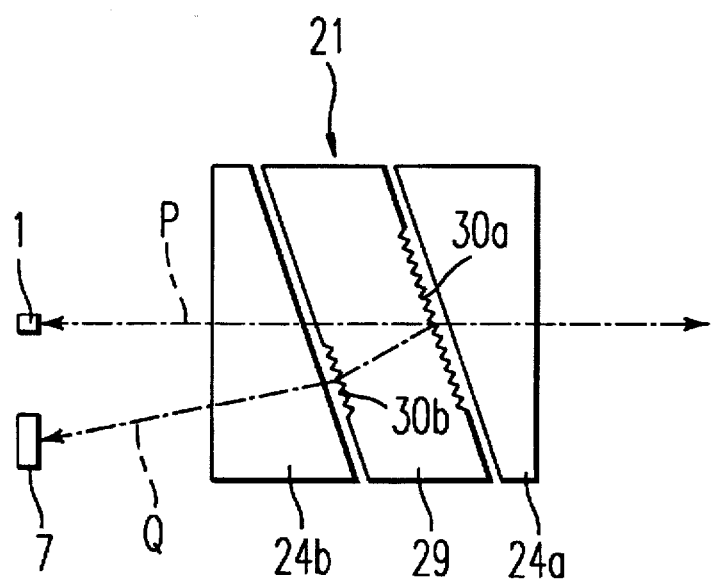
FIG. 20 is a side view showing a prism-diffraction device of an eleventh embodiment of the present invention.

Next, an eleventh embodiment of the present invention will be described, referring to FIG. 20. The same elements as shown in FIGS. 1 to 19 are designated by the same reference numerals and the description will be omitted.

An optical head in this embodiment is based on the eighth embodiment described above, and in the grating substrate 29 in the prism-diffraction device 21, a diffraction grating 30b located at a side of the PD 7 is formed only at an area through which the reflection light which is diffracted by the diffraction grating 30a and proceeds to the PD 7 passes, an area corresponding to the LD 1 is formed as a non-diffraction area which is a simple plane. That is, the diffraction grating 30b is formed out of a position of a light axis of the incident light.

According to this structure, the emitted light from the LD 1 does not pass through the diffraction grating 30b and passes through only the diffraction grating 30a, and then proceeds to a side of the objective lens 14. Therefore, turbulence phenomenon of a wavefront aberration, which is generated when the light passes though the diffraction grating, is reduced, and a slight reduction of effectiveness in utilization of light at that time is eliminated. As a result, as a wavefront aberration which is generated at the diffraction grating itself is reduced, tolerance distribution of installation accuracy is eased, and further, as the diffraction light is not generated, high accurate signal detection without a flare light can be achieved.

Figure 18:
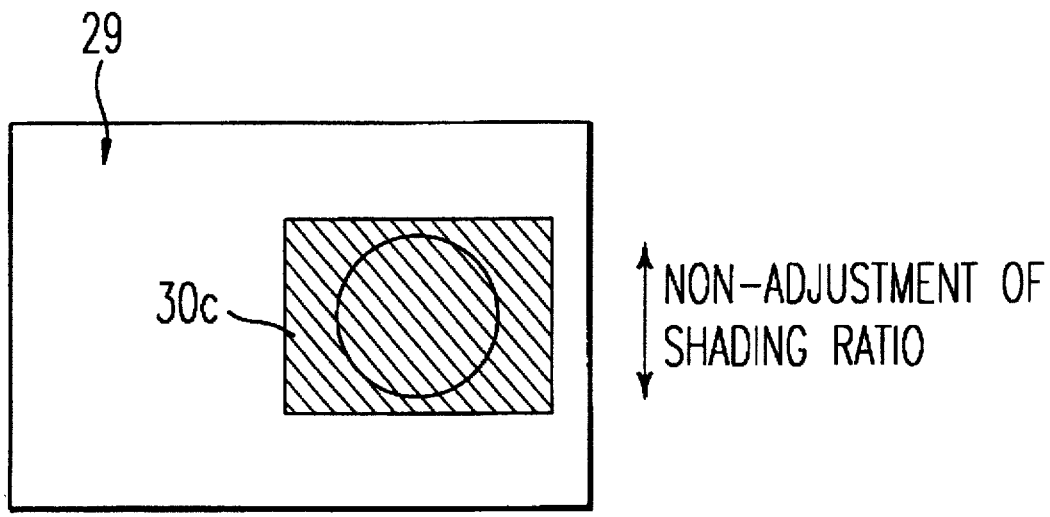
FIG. 18 is a front view showing a grating substrate of a ninth embodiment of the present invention.

Though, in this embodiment, it is applied to the diffraction grating 30a, it can be applied to the diffraction grating 30c in FIG. 18.

Figure 22:
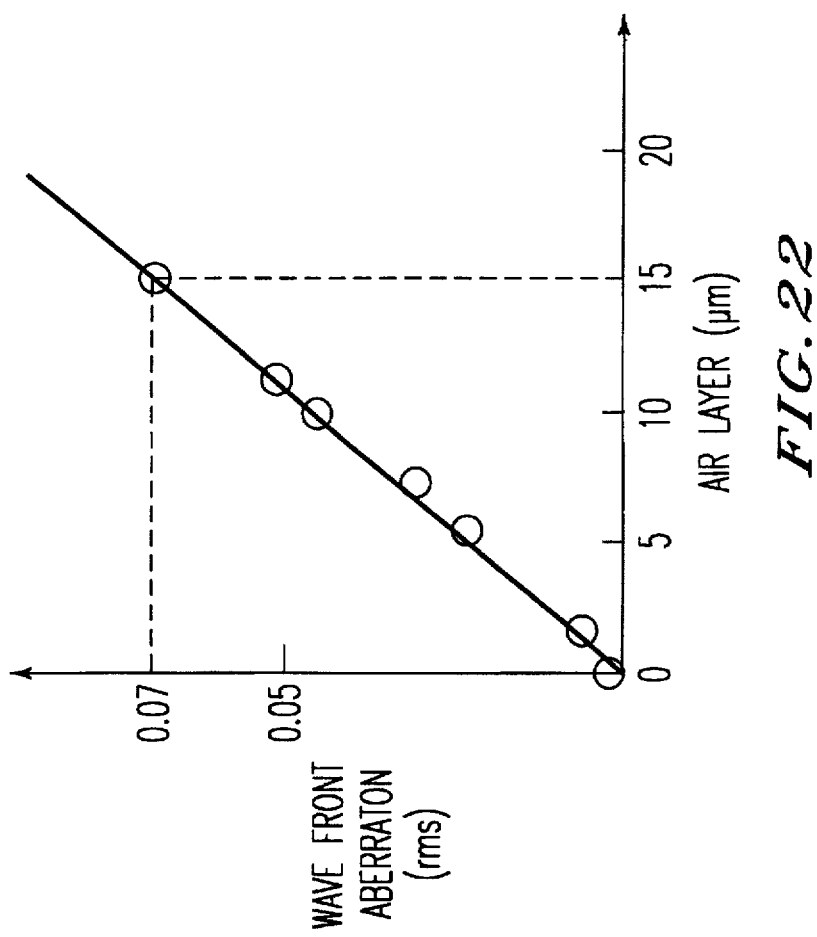
FIG. 22 shows a relation between a thickness of an air layer and a wavefront aberration.
Figure 21:
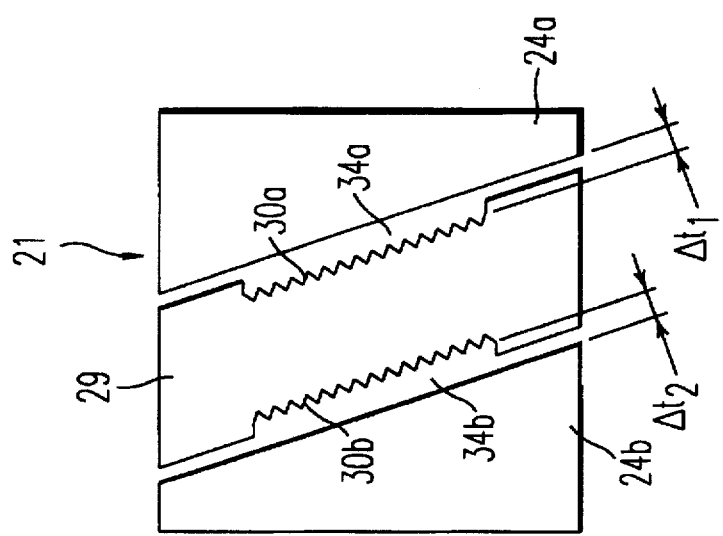
FIG. 21 is a side view showing a prism-diffraction device of a twelfth embodiment of the present invention.
Figure 24:
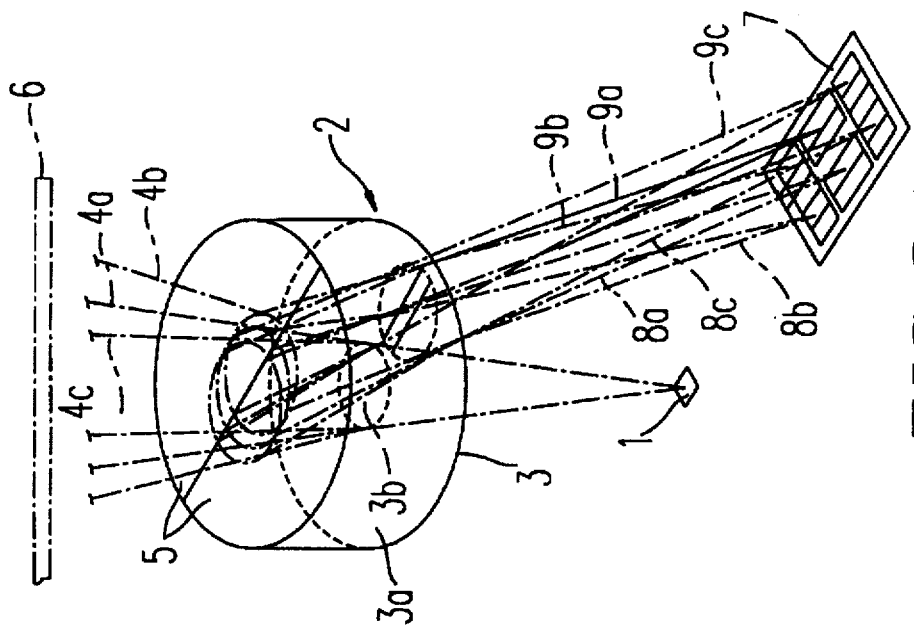
FIG. 24 is a perspective view showing a light receiving state of a diffraction light in an optical head of a background device.

Next, a twelfth embodiment of the present invention will be described, referring to FIGS. 21 and 22. The same elements as shown in FIGS. 1 to 20 are designated by the same reference numerals and the description will be omitted.

An optical head in this embodiment is based on the eighth embodiment described above, and in the prism-diffraction device 21a, a thickness $\Delta t1$ of an air layer 34a between the diffraction grating 30a and the prism 24a is set to 15 μm or less and a thickness $\Delta t2$ of an air layer 34b between the diffraction grating 30b and the prism 24a is set to 15 μm or less respectively.

Existence of the air layers 34a and 34b are necessary so that the high density diffraction gratings 30a and 30b can have a polarization dependence characteristic. This is why as higher diffraction efficiency is required in order to lead the reflection light from the optical disk 6 to the PD 7 efficiently, the existence of the air layer of which refractive index is as different as possible from that of a material of the grating, is desired. On the contrary, as such air layers 34a and 34b cause the emission light proceeding to the objective lens 14 to generate a wavefront aberration, and however they prevent a spot on the optical disk 6 from focusing small upto a diffraction limit. Therefore, though the air layers 34a and 34b are required, they are desired to be as thin as possible. Generally, it is required that rms. is smaller than or equal to 0.07 in order to focus small upto the diffraction limit. Thus, in this embodiment, according to a relation between the thickness of the air layer and the wavefront aberration in FIG. 22, the thicknesses Δt1 and Δt2 of the air layers 34a and 34b are set to 15 μm or less. Practically, considering tolerance distribution of other optical elements, the thicknesses Δt1 and Δt2 of air layers 34a and 34b are required to be thin.

According to this embodiment, even if necessary air layers 34a and 34b exist, as the wavefront aberration becomes small, forming accuracy of other optical elements can be eased and installation accuracy of each element can be eased whereby total cost can be reduced.

Figure 23:
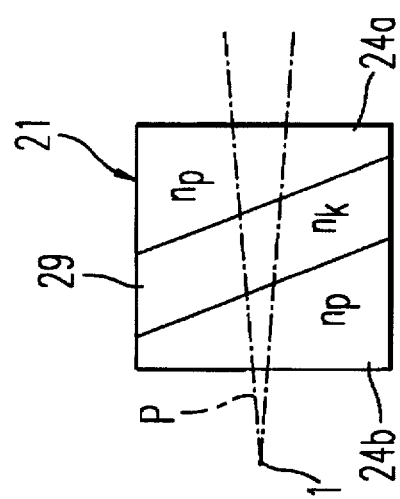
FIG. 23 is a schematic side view showing a prism-diffraction device of a thirteenth embodiment of the present invention.

Next, a thirteenth embodiment of the present invention will be described, referring to FIG. 23. The same elements as shown in FIGS. 1 to 20 are designated by the same reference numerals and the description will be omitted.

An optical head in this embodiment is based on the eighth embodiment described above, and in the prism-diffraction device 21, when a refractive index of the grating substrate is nk and those of the prisms 24a and 24b are np, it is set that nk is larger than np. In FIG. 23, the diffraction gratings 23a and 23b are omitted.

Such a structure is equivalent to that in which a thin parallel plane exists with being inclined, and astigmatic difference of the LD 1 can be compensated for. Especially, if those refractive indexes nk and np are set properly, irradiating light of higher quality onto a disk can be obtained and a LD 1 of large astigmatic difference can be employed whereby yield can be improved.

In the above description, though the ninth to thirteenth embodiments are based on the eighth embodiment, it is also possible that they may be based on the fourth embodiment.

Finally, technical advantages of the present invention will now be described.

According to the first embodiment, since the emission light from the laser light source and the reflection light from the optical data recording medium are split and only the reflection light is transmitted through the diffraction grating and is led to the photo-detector, the problem that the amount of the light onto the optical data recording medium is decreased is eliminated, and thus an optical head of high effectiveness in utilization of light can be obtained. Further, a low cost of the optical head can be achieved because a low power LD can be used.

According to the second embodiment, since the zeroth light of high intensity from the diffraction grating is led to the one detecting surface of the plural detecting surfaces of the photo-detector and is used as the reproducing signal, and the signal detection is executed by the high speed amplifier, a high carrier to noise ratio can be achieved. Moreover, since only one valuable high speed amplifier is required, low cost can be achieved. Further, since the diffraction efficiency can be even low, yield can be increased and productivity can become high.

According to the third embodiment, the dual-grating device is that the diffraction gratings where the diffraction efficiency is changed in accordance with the polarization direction are formed on both surfaces of the substrate and at least one of the diffraction gratings is formed by a method that two diffraction gratings of different grating shapes are superposed. Therefore, the focus error signal can be detected with assuring stability with the passage of time by the beam size method. Moreover, since such a dual-grating device has both a polarization split function and a light split function, the number of the optical elements can be reduced and high effectiveness in utilization of light can be obtained. In addition, installation can be simplified and an optical head of low cost can be provided thereby.

According to the fourth embodiment, the prism-diffraction device is such that on both surfaces of the grating substrate, diffraction gratings are formed in which the diffraction efficiency is changed in accordance with the polarization, and the two prisms which sandwich this substrate, are formed in unity. Therefore, the generation of astigmatic aberration of the emission light proceeding to the optical data recording medium can be suppressed to be as low as possible and accurate signal detection can be achieved. Further, since such a prism-diffraction device of the cube shape can be formed by an easy process, the productivity can become high and the production cost can be reduced.

According to the fifth embodiment, since the step by which the tip of the diffraction grating becomes lower than the plane portion is formed, the interval between the two prisms can become narrow and the generation of the astigmatic aberration of the light proceeding to the optical data recording medium can be suppressed, and accurate signal detection can be achieved. Moreover, since such a step protects the diffraction grating, the treatment in installation can become easy, the yield can be improved and the productivity can be increased.

According to the sixth embodiment, since the grooves are formed around the diffraction grating, adhesive can be prevented from flowing into the diffraction grating and the yield in installation can be improved and the productivity can be increased.

According to the seventh embodiment, since the chirping process is executed on the diffraction grating of the grating substrate, aberration which is generated when the reflection light from the optical data recording medium passes through the prism-diffraction device can be compensated for, aberration of the light spot irradiated onto the photo-detector can be eliminated, and more accurate signal detecting can be achieved.

According to the eighth embodiment, since the grating substrate is thick so as to split the light axis of the emission light and that of the reflection light, the reflection light can be greatly split from the emission light instead of widening the split angle on the basis of the pitch difference between the diffraction gratings, the pitch of either one of the diffraction gratings is not out of the optimum condition under which the diffraction efficiency depends on the polarization, and the property relative location between the laser light source and the photo-detector is achieved.

According to the ninth embodiment, since the diffraction grating of the one surface of the grating substrate is formed by the superposing of the two diffraction gratings of different grating shapes, a focusing error signal can be detected by the beam size method and the adjustment of the light axis can be easily realized, compared to the case of the diffraction grating divided into plural areas.

According to the tenth embodiment, the tracking detection by the three beam method or the differential push-pull method where the signal detection is stable to the tilt of the optical data recording medium becomes possible and the compatibility between the optical data recording media of different track pitches can be obtained.

According to the eleventh embodiment, since the diffraction grating of the one surface of the grating substrate is formed at the portion where only the reflection light from the objective lens to the photo-detector passes, the emission light from the laser light source to the optical data recording medium passes only the diffraction grating of the other surface of the grating substrate, whereby the turbulence phenomenon of the wavefront aberration is reduced, unnecessary diffraction light is not generated, and effectiveness in utilization of light can be improved. As a result, a lower power laser light source can be employed and low cost can be achieved.

According to the twelfth embodiment, since the thickness of the air layer between each diffraction grating and each prism is 15 μm or less, generation of wavefront aberration of the emission light from the laser light source to the objective lens can be suppressed, and thereby the forming accuracy or the installing accuracy of other optical elements can be eased whereby total cost can be reduced.

According to the thirteenth embodiment, since the refractive index of the grating substrate is larger than that of the two prisms, the structure of the prism-diffraction device becomes equivalent to that in which a thin parallel plane exists with being inclined, and astigmatic difference of the laser light source can be compensated for. Therefore, high quality of the irradiated light onto the optical data recording medium can be realized and a laser light source of even a large astigmatic difference can be employed.

Obviously, numerous modifications and variations of the present invention are possible in light of the above teachings. It is therefore to be understood that, within the scope of the appended claims the present invention may be practiced otherwise than as specifically described herein.

What is claimed as new and desired to be secure by Letters Patent of the United States is:

1. An optical head which records data onto an optical data recording medium and reproduces the data therefrom comprising:
a laser light source emitting a laser light;
a collimator lens collimating the emitted light from the laser light source;
an objective lens focusing the emitted light onto the optical data recording medium;
a light splitting device arranged between the laser light source and the objective lens, for splitting the emitted light source from the laser light and for splitting a reflected light from the optical data recording medium; and
a diffraction grating formed between the laser light source and the optical data recording medium, wherein only the reflected light split at the light splitting device is incident on the diffraction grating, and which leads the reflected light split at the light splitting device to a photo-detector.

2. The optical head apparatus of claim 1, further comprising a higher speed amplifier and a lower speed amplifier, and wherein a detecting surface of the photo-detector is divided into a plurality of areas, and a zeroth order light split at the diffraction grating is led to a first of the plurality of areas and a light split at the diffraction grating other than the zeroth order light is led to a second of the plurality of areas, and the higher speed amplifier is connected to the first area whereto the zeroth order light is led and the lower speed amplifier is connected to the second area whereto the light other than the zeroth order light is led.

3. The optical head apparatus of claim 1, wherein the light splitting device changes an emission angle of light output therefrom in accordance with a polarization direction of incident light.

4. The optical head apparatus of claim 1, wherein the light splitting device changes a light axis of light output therefrom in accordance with a polarization direction of the incident light.

5. An optical head apparatus which records data onto an optical data recording medium and reproduces the data therefrom comprising:

a laser light source emitting a laser light;
a collimator lens collimating the emitted light from the laser light source;
an objective lens focusing the emitted light onto the optical data recording medium; and
a dual-grating device having two sides and including a diffraction grating formed on each of the two sides, for changing a diffraction efficiency in accordance with a polarization direction of incident light, and wherein at least one diffraction grating is formed by a superposition of two diffraction grating elements having different grating vectors and pitches, and which leads a reflected light from the optical data recording medium onto a photo-detector.

6. The optical head apparatus of claim 5, wherein a focusing error signal detection is performed using two plus first order lights diffracted at the dual-grating device by a beam size method.

7. An optical head apparatus which records data onto an optical data recording medium and reproduces the data therefrom comprising:
a laser light source emitting a laser light;
a collimator lens collimating the emitted light from the laser light source;
an objective lens focusing the emitted light onto the optical data recording medium; and
a prism-diffraction device including a grating substrate and diffraction gratings changing a diffraction efficiency in accordance with a polarization direction of incident light formed on both surfaces of the grating substrate, and two prisms sandwiching the grating substrate, formed in unity, and which leads a reflected light from the optical data recording medium onto a photo-detector.

8. The optical head apparatus of claim 7, wherein a surface of the grating substrate wherein a respective diffraction grating is formed includes a diffraction grating portion whereon the diffraction grating is formed and a plane portion, and the diffraction grating is formed on a step whereby a tip of the diffraction grating is lower than the plane portion.

9. The optical head apparatus of claim 7, wherein a surface of the grating substrate wherein the diffraction grating is formed includes a diffraction grating portion whereon the diffraction grating is formed, a plane portion and a groove portion formed around the diffraction grating portion.

10. The optical head apparatus of claim 7, wherein a chirping process is performed on at least one diffraction grating of the diffraction gratings formed on the grating substrate.

11. The optical head apparatus of claim 7, wherein the grating substrate has a predetermined thickness to split a light axis of the emitted light from the laser light source and a light axis of the reflected light from the optical data recording medium.

12. The optical head apparatus of claim 7, wherein at least one diffraction grating on the grating substrate is formed by a superposition of two diffraction grating elements having different shapes.

13. The optical head apparatus of claim 7, further comprising a diffraction device splitting the emitted light from the laser light source into three light beams and formed on at least one of the two prisms.

14. The optical head apparatus of claim 7, wherein one diffraction grating on the grating substrate is located so that only the reflected light from the optical data recording medium can pass therethrough.

15. The optical head apparatus of claim 7, wherein a thickness of an air layer between the diffraction grating on the grating substrate and the prism is 15 μm or less.

16. The optical head apparatus of claim 7, wherein a refractive index of the grating substrate is larger than a refractive index of the two prisms.

* * * * *